March 8, 1932. J. J. DETTLING 1,849,034
TIRE SPREADER
Filed July 25, 1928
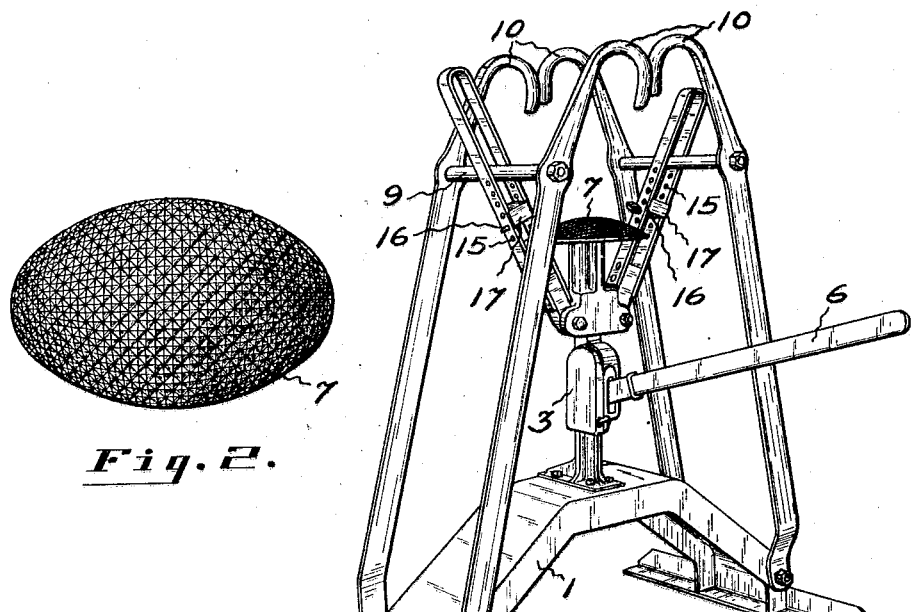
Fig. 2.
Fig. 1.
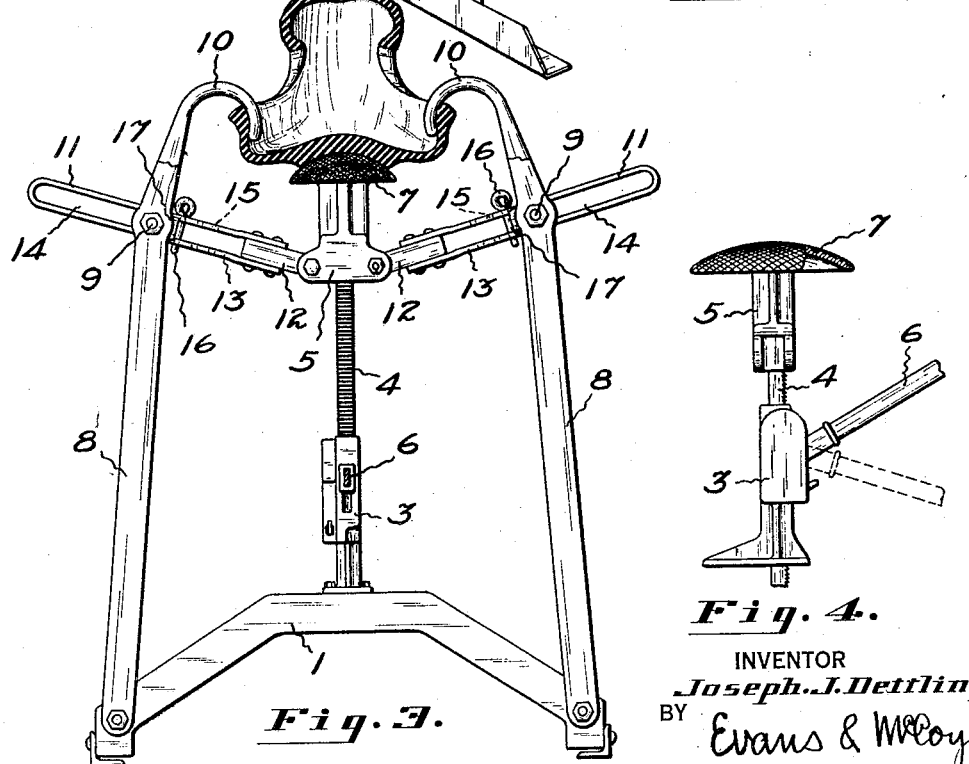
Fig. 3.
Fig. 4.
INVENTOR
Joseph J. Dettling.
BY Evans & McCoy
ATTORNEYS Patented Mar. 8, 1932

1,849,034

UNITED STATES PATENT OFFICE

JOSEPH J. DETTLING, OF AKRON, OHIO, ASSIGNOR TO THE GENERAL TIRE & RUBBER COMPANY, OF AKRON, OHIO, A CORPORATION OF OHIO

TIRE SPREADER

Application filed July 25, 1928. Serial No. 295,144.

This invention relates to tire spreaders for use in the manufacture and repair of pneumatic tire casings, the device operating to spread the bead edges of the casing and expose the interior of the casing for inspection or repair.

The present invention has for an object to provide a tire spreader which is adapted to be quickly and easily engaged with the tread and bead portions of a tire casing and which, when so engaged, may be easily and quickly operated to open up the portion of the casing engaged thereby.

A further object is to provide a tire spreader which securely holds the portion of the tire casing which is engaged thereby in a convenient position for repair work and which provides a rigid support for the opened portion of the casing.

A further object is to provide a tire spreader which can be readily adjusted for operation on tire casings of any standard size.

A further object is to provide a spreader which is of simple and rugged construction and which is inexpensive to manufacture.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Figure 1 is a perspective view of the tire spreader.

Fig. 2 is a plan view of the tread engaging head.

Fig. 3 is a side elevation showing a tire engaged by the spreader and held in open position.

Fig. 4 is a detail view showing the tread engaging head and the jack by which it is operated.

Referring to the accompanying drawings, the spreader is provided with an arched base 1, which has laterally extending foot portions at opposite ends which support the machine on the floor or ground. At the center of the base 1, there is mounted a jack casing 3 in which is slidably mounted a vertically disposed ratchet bar 4 which carries a head 5 at its upper end. The ratchet bar 4 is raised and lowered in the casing 3 by means of an actuating hand lever 6 through suitable actuating and stop pawls such as commonly employed in ratchet jacks. At the top of the head 5, there is an enlarged oval shaped convex tread engaging portion 7 upon which the tire is supported during the spreading operation and this tread engaging portion is preferably roughened to prevent the tire from slipping during the operation of the spreader. The tread engaging portion 7 also forms a relatively wide rigid support for the portion of the tire casing opened by the spreader and is disposed at a convenient height when the tire is opened for repair operations upon the interior of the tire casing.

Upwardly extending arms 8 are pivoted at their lower ends to the base 1 adjacent the opposite ends thereof and extend upwardly on opposite sides of the vertically movable head 5. The arms 8 are arranged in pairs on opposite sides of the base 1 at each end and are connected adjacent their upper ends by cross pins 9. The upper ends of the arms 8 are bent inwardly and downwardly above the tread engaging member 7 to provide hooks 10 for engagement with the beaded edges of a tire casgagement, resting with its tread upon the supporting head.

The links 11 are pivoted at their inner ends to the head 5 and extend outwardly therefrom between the arms 8 on opposite sides of the head. The links 11 are each composed of an inner short bar 12, which is pivotally connected to the head and a strap 13 which is bent back upon itself and attached at its ends to the opposite faces of the short bar 12 to provide a longitudinal slot 14 extending throughout the major portion of the links 11. The pins 9 connecting the arms 8 of each pair pass through the slots 14, thereby providing a pin and slot connection between the links 11 and the hook carrying arms. The straps 13 are provided with longitudinal rows of apertures 15 which are adapted to receive pins 16 for securing stop blocks 17 in adjusted positions in the slot 14. The adjustable blocks 17 are positioned to the inner sides of the cross pins 9 and engage the cross pins on upward movement of the head 5 to swing the arms 8 apart to spread the bead portions of the tire, the links 11 and head 5 being arranged in the form of a toggle which is straightened as the head is elevated to move the upper hooked ends of the arms apart. When the head 5 is in its lowermost position, as shown in Fig. 1, the pin and slot connection between the links 11 and arms 8 permit the arms to be swung apart to permit a tire casing to be inserted between them. The supporting head 5, when in lowered position, is at a distance below the hooks 10, such that a tire casing may be inserted between the hooks and lowered until its tread rests upon the supporting portion 7 of the head, at which time the bead portions of the tire casing will be below the hooks 10, which return by gravity to the position shown in Fig. 1, directly over the interior opening of the casing. The head 5 is then elevated by means of the actuating lever 6, lifting the casing into engagement with the hooks 10, which enter the space between the beaded edges of the casing.

On continued upper movement of the head 5, the stop blocks 17 are brought into engagement with the cross pins 9 and the arms 8 are gradually swung apart, spreading the beads of the tire casing and opening the interior thereof, as illustrated in Fig. 3 of the drawing. The extent of lateral movement of the hooks 10 may be varied by adjusting the positions of the stop block 17 so that the proper spreading movement may be obtained for a tire casing of any standard size.

A relatively wide roughened tread support 7 provides a rigid support for the tire casing when it is opened and by reason of its convex shape and its roughened surface rigidly holds the opened portion of the tire casing against movement while repair operations are being performed upon the interior of the casing.

It will be apparent that the present invention provides a very simple and effective tire spreader, which permits quick insertion of the tire casing to be spread and which automatically engages and spreads the tire casing when operated after insertion of the casing.

It will further be apparent that the device can be very quickly and easily adjusted for tire casings of any standard size and that the tire casing, when opened is rigidly supported with its interior surface exposed in a convenient position for repair operations.

Furthermore, it is to be understood that the particular form of apparatus shown and described, and the particular procedure set forth, are presented for purposes of explanation and illustration and that various modifications of said apparatus and procedure can be made without departing from my invention, as defined in the appended claims.

What I claim is:

1. A tire spreader comprising a fixed supporting frame, a member mounted for vertical movement in the frame and having a head engageable with the tread of a tire casing, arms on opposite sides of said vertically movable member, said arms being pivoted at their lower ends to said frame and being provided at their upper ends with hooks engageable with the beads of a tire casing resting with its tread on said head, means for raising the vertically movable member to press the tread of a tire casing upwardly, and means operated by said vertically movable member for swinging said arms apart to spread the bead portions of the tire casing.

2. A tire spreader comprising a fixed supporting frame, a member mounted for vertical movement in the frame and having a head engageable with the tread of a tire casing, arms pivoted at their lower ends to said base and extending upwardly on opposite sides of said head, said arms extending above the head and having their upper ends bent inwardly towards each other and downwardly to provide hooks for engagement with the beads of a tire casing resting with its tread on said head, means for raising said vertically movable member to press the tread portion of a tire casing upwardly, and links connecting said vertically movable member and arms for simultaneously swinging said arms apart to spread the bead portions of the tire casing.

3. A tire spreader comprising a fixed supporting frame, a member mounted for vertical movement in the frame, said member having an enlarged head provided with a relatively wide upper surface for engagement with the tread portion of a tire casing, oppositely disposed hooks above said head for engagement with the bead portions of a tire casing resting with its tread on said head, said hooks being mounted on the frame for lateral movements, means for elevating said head to press the tread portion of the tire casing upwardly, and links connecting said head and hooks for simultaneously moving said hooks apart to spread the bead portions thereof.

4. A tire spreader comprising a fixed supporting frame, a member mounted for vertical movement in the frame, said member having an enlarged head provided with a relatively wide upper surface for engagement with the tread portion of a tire casing, oppositely disposed hooks above said head for engagement with the bead portions of a tire casing resting with its tread on said head, said hooks being mounted on the frame independently of the vertically movable member for lateral movements, means connecting said hooks and vertically movable member for moving said hooks apart as said member is moved upwardly, and means for raising and lowering said member.

5. A tire spreader comprising a fixed supporting frame, a jack mounted on said frame and having a vertically movable head for engagement with the tread of a tire casing, arms pivoted at their lower ends to the frame on opposite sides of the jack, said arms having hooks at their upper ends engageable with the beads of a tire casing resting with its tread on said head, and link connections between said head and arms for swinging said arms apart as said head is elevated.

6. A tire spreader comprising a fixed supporting frame, a jack mounted on said frame and having a vertically movable head for engagement with the tread of a tire casing, arms pivoted at their lower ends to the frame on opposite sides of the jack, said arms having hooks at their upper ends engageable with the beads of a tire casing resting with its tread on said head, and links pivoted at their inner ends to the head and having pin and slot connections with said arms.

7. A tire spreader comprising a fixed supporting frame, a jack mounted on said frame and having a vertically movable head for engagement with the tread of a tire casing, arms pivoted at their lower ends to the frame on opposite sides of the jack, said arms having hooks at their upper ends engageable with the beads of a tire casing resting with its tread on said head, links pivoted at their inner ends to the head and having pin and slot connections with said arms, and adjustable means for varying the play of the pins in the slots.

8. A tire spreader comprising a fixed supporting frame, a jack mounted on said frame and having a vertically movable head for engagement with the tread of a tire casing, arms pivoted at their lower ends to the frame on opposite sides of the jack, said arms having hooks at their upper ends engageable with the beads of a tire casing resting with its tread on said head, link connections between said head and arms for swinging said arms apart as said head is elevated, and means for varying the effective lengths of the arm actuating links.

9. A tire speaker comprising a fixed supporting frame, a jack mounted on said frame and having a vertically movable head for engagement with the tread of a tire casing, arms pivoted at their lower ends to the frame on opposite sides of the jack, said arms having hooks at their upper ends engageable with the beads of a tire casing resting with its tread on said head, links pivoted at their inner ends to the head and having longitudinal slots, pins carried by the arms and engaging said slots, and stop members in the slots inwardly of said pins, said stop members being adjustable longitudinally of the slots.

In testimony whereof I affix my signature.

JOSEPH J. DETTLING.